United States Patent
Altenkirch et al.

(10) Patent No.: US 6,773,369 B2
(45) Date of Patent: Aug. 10, 2004

(54) CONTROL DEVICE FOR AN AUTOMATICALLY AND MANUALLY SHIFTABLE GEARBOX IN A MOTOR VEHICLE

(75) Inventors: Manfred Altenkirch, Wasbüttel (DE); Bernhard Ott, Cremlingen (DE); Andreas Löhner, Königslutter (DE)

(73) Assignee: Volkswgen AG, Wolfsburg (DE)

( * ) Notice: Subject to any disclaimer, the term of this patent is extended or adjusted under 35 U.S.C. 154(b) by 90 days.

(21) Appl. No.: 10/149,630

(22) PCT Filed: Dec. 6, 2000

(86) PCT No.: PCT/EP00/12241

§ 371 (c)(1), (2), (4) Date: Oct. 21, 2002

(87) PCT Pub. No.: WO01/42686

PCT Pub. Date: Jun. 14, 2001

(65) Prior Publication Data

US 2003/0056613 A1 Mar. 27, 2003

(30) Foreign Application Priority Data

Dec. 10, 1999 (DE) .......................................... 199 59 616

(51) Int. Cl.[7] .............................................. F16H 59/02
(52) U.S. Cl. .................. 475/132; 74/473.18; 200/61.88
(58) Field of Search ................................. 475/132, 131; 74/473.18, 335; 200/61.88

(56) References Cited

U.S. PATENT DOCUMENTS 5,406,860 A 4/1995 Easton et al.
5,584,209 A 12/1996 Issa
6,223,112 B1 * 4/2001 Nishino ........................ 701/55

FOREIGN PATENT DOCUMENTS

| DE | 41 35 362 C2 | 4/1993 |
|---|---|---|
| DE | 41 35 362 A1 | 4/1993 |
| DE | 199 05 627 A1 | 8/1999 |
| DE | 198 10 479 A1 | 9/1999 |
| DE | 199 38 528 A1 | 2/2001 |
| EP | 0 895 003 A1 | 2/1999 |
| EP | 0 899 479 A1 | 3/1999 |

* cited by examiner

*Primary Examiner*—Ankur Parekh (57) ABSTRACT

The invention relates to a control device (1) for an automatically and manually shiftable gearbox in a motor vehicle. The inventive control device comprises a selector lever (2) for adjusting at least the forward position (D), neutral (N), reverse (R), parking position (P) and a position (M) for manual shifting. A first and a second tip switch (3a, 3c) can be actuated in the position (M) for manual shifting. Signals for manually shifting up or down with regard to the gear ratio are supplied to a control device (7) for controlling the gearbox by means of position sensors (5) and control lines (6). Failure of the position sensors (5) and/or the control lines (6) that are allocated to said sensors can be detected. The control device is improved by configuring said control device (1), with regard to shifting, in such a way that all the position sensors (5) can be checked and the failure of a position sensor (5) and/or a control line (6) can be detected at least in the parking position (P) or reverse (R) position of the selector lever (2).

6 Claims, 6 Drawing Sheets

| Diagnosis Tip Switch | 0 Low at SG Switch / 1 High at SG | | | Switch closed / Switch open | Magnet at Switch / Magnet not at Switch |
|---|---|---|---|---|---|
| Selector Lever | Tip- | M | Tip+ | | Reactions |
| P | 0 | 0 | 0 | 0 Valid State Selector Lever in P | |
|   | 0 | 0 | 0 | 1 Break Tip+ | Set Error |
|   | 0 | 0 | 1 | 0 Break M | Set Error |
|   | 0 | 0 | 1 | 1 Break Tip+ and M | Set Error |
|   | 0 | 1 | 0 | 0 Break Tip- | Set Error |
|   | 0 | 1 | 0 | 1 Break Tip- and Tip+ | Set Error |
|   | 0 | 1 | 1 | 0 Break Tip- and M | Set Error |
|   | 0 | 1 | 1 | 1 Break Tip-, M and Tip+ | Set Error |
| R | 1 | 0 | 0 | 0 Ground Contact Tip+ | Set Error |
|   | 1 | 0 | 0 | 1 Valid State Selector Lever in R | |
|   | 1 | 0 | 1 | 0 Break M and Ground Contact Tip+ | Set Error |
|   | 1 | 0 | 1 | 1 Break M | Set Error |
|   | 1 | 1 | 0 | 0 Break Tip- and Ground Contact Tip+ | Set Error |
|   | 1 | 1 | 0 | 1 Break Tip- | Set Error |
|   | 1 | 1 | 1 | 0 Break M and Tip- | Set Error |
|   | 1 | 1 | 1 | 1 Break M, Tip- and Tip+ | Set Error |
| N | 0 | 0 | 0 | 0 Ground Contact M and Tip+ | Set Error |
|   | 0 | 0 | 0 | 1 Ground Contact M | Set Error |
|   | 0 | 0 | 1 | 0 Ground Contact Tip+ | Set Error |
|   | 0 | 0 | 1 | 1 Valid State Selector Lever in N | |
|   | 0 | 1 | 0 | 0 Break Tip- and Ground Contact M and Tip+ | Set Error |
|   | 0 | 1 | 0 | 1 Break Tip- and Ground Contact M | Set Error |
|   | 0 | 1 | 1 | 0 Break Tip- and Ground Contact Tip+ | Set Error |
|   | 0 | 1 | 1 | 1 Break Tip- | Set Error |
| D | 0 | 0 | 0 | 0 Invalid State M Gate, Tip+ and Tip- simultaneously | No Reaction |
|   | 0 | 0 | 0 | 1 Valid State M Gate, Tip- | Shift Down Gear |
|   | 0 | 0 | 1 | 0 Ground Contact Tip+ and Tip- | Set Error |
|   | 0 | 0 | 1 | 1 Ground Contact Tip- | Set Error |
|   | 1 | 0 | 0 | 0 Valid State M Gate, Tip+ | Shift Up Gear |
|   | 1 | 0 | 0 | 1 Valid State M Gate active | |
|   | 1 | 1 | 1 | 0 Ground Contact Tip+ | Set Error |
|   | 1 | 1 | 1 | 1 Valid State Selector Lever in D | |

Filter Times:
T1=500ms
T2=120s
T3=40ms

CONTROL DEVICE FOR AN AUTOMATICALLY AND MANUALLY SHIFTABLE GEARBOX IN A MOTOR VEHICLE

BACKGROUND OF THE INVENTION

FIELD OF THE INVENTION

The invention relates to a control device for a transmission which can be shifted automatically and manually in a motor vehicle, having a selector lever for setting at least the forward D, neutral N, reverse R, parking P positions and a position M for manual gearshifts, it being possible to activate a first and second tip switch in the position M for manual gearshifts, corresponding signals for manually shifting the transmission ratios up and down being output to a control unit in order to control the transmission via position sensors and control lines, and it being possible to determine a failure of the position sensors and/or of the control lines assigned to the position sensors.

The selector levers known previously in the prior art have the switch settings "4", "3", "2" and "3 to 1" for gearspeed limitation, for example for traveling downhill, said switch settings switching the transmission to the corresponding gearspeed. In the more recent selector levers known from the prior art, this gearspeed limitation is dispensed with to a certain extent if, namely, the transmission is embodied as an automated transmission and a tip switching activation is used. Here, the driver can shift the gearspeeds down manually via the tip gate and thus obtain the necessary engine brake effect when traveling downhill, for example. The tip switching connects a ground potential to an input of the control unit when the corresponding tip key or the corresponding tip switch is activated. These tip switches for the tip "switching" are generally Hall elements which are arranged in the gearshift cover and are activated or triggered by means of a magnet. It is problematic that at present optimum diagnostics cannot be carried out on these Hall switches, that is to say it is not possible to determine to an optimum degree whether these switches are operationally capable at a particular time so that for safety reasons it is not always possible to dispense with the corresponding gearspeed limitation.

In the prior art, DE-A-199 05 627 discloses a control device for a transmission in a motor vehicle which has a multiplicity of sensors, the sensors being arranged or provided at certain intervals in such a way that the different settings of the selector lever can be determined using these sensors. The intention is to increase the failsafeness of the sensor system with the arrangement of the multiplicity of sensors described here.

DE-A-41 35 362 discloses an electrical control device for an automatic transmission in which, in order to sense the position set at the selector lever, the various shift positions are detected by means of the arrangement of a plurality of contacts, after which a bit pattern is generated and processed by the electronic transmission control unit, it being possible to "correct" the position code in the case of simple faults.

In the prior art on which the invention is based, a control device is disclosed which is described in the non-prepublished patent application 199 38 528 and in which "dynamic diagnostics" are carried out only if the selector lever is moved outside the position M for manual gearshifts, namely outside the tip gate. For this purpose, Hall sensors are provided in the tip gate, respectively for the first and second tip switches and for the position M between the first and second tip switches which can be correspondingly triggered with a first permanent magnet assigned to a selector lever. In addition, a second permanent magnet is provided which is arranged at a specific distance from the first permanent magnet and which is secured to the shutter which covers the selector lever pivoting region. This second permanent magnet is arranged in such a way that, as it moves out of the parking P position into the reverse R position, it triggers the Hall sensor for the first tip switch (tip +), and, during the corresponding movement of the selector lever, the other Hall sensors are then sequentially triggered one after the other using this second permanent magnet. At the time when the Hall sensors are triggered in succession, test signals are transmitted to the control unit. A separately provided evaluation circuit with a sequence generator generates the corresponding signals here on the basis of the test signals which are present. At the time when all the Hall sensors are detected as being satisfactory, specifically when the corresponding frequency pattern is present, the selector lever can then be engaged from the forward D position into the position M for manual gearshifts. If the corresponding frequency pattern is not present after the "dynamic diagnostics" of all the Hall sensors, it is detected that at least one Hall sensor or a control line which is assigned to this Hall sensor is in fact not functioning satisfactorily and an audible and/or visual warning signal for the driver is issued before the engagement of the selector lever into the position M for manual gearshifts, in order to indicate that the manual shift activations are not functioning here.

The "dynamic diagnostics" of the known control device just described are not yet embodied in an optimum way. On the one hand, in the parking P position of the selector lever, it is not possible to diagnose whether all the Hall sensors or the control lines assigned to these Hall sensors are functioning satisfactorily. In the known control device, a dynamic sequential interrogation of the individual Hall sensors (position sensors) takes place, specifically only when the selector lever is correspondingly activated from the parking P position in the direction of the forward D position. If a fault has occurred, the driver can then be warned by the audible or visual warning signal only just before the forward D position is reached. This can lead to overhasty reactions of the driver if he already wishes to engage the position M for manual gearshifts and is only correspondingly warned at this time, specifically just in advance. On the other hand, with the known control device it is also not possible to detect possible short-circuits between the control lines in good time using the control unit. As a result, the embodiment of this known control device on which the invention is based is not yet optimum.

SUMMARY OF THE INVENTION

The invention is therefore based on the object of configuring and developing a control device of the type mentioned at the beginning in such a way that early warning for the driver of the vehicle is ensured as satisfactorily as possible and/or it is possible to check the control lines for short-circuits.

The object which is indicated in advance is then initially triggered with the features of the characterizing part of patent claim 1 by virtue of the fact that the control device is embodied in terms of circuit technology in such a way that, at least in the parking P or reverse R position of the selector lever, all the position sensors can be checked and the failure or short-circuit to "+" or a break in a line of a position sensor and/or of a control line can be determined. Furthermore, the previously indicated object is achieved by means of the features of the characterizing part of the independent patent claim 2 by virtue of the fact that the control device is embodied in terms of circuit technology in such a way that, in the neutral N or forward D position of the selector lever, a short-circuit to ground of the control lines assigned to the position sensors can be determined. Finally, the previously indicated object is achieved by means of the features of the characterizing part of the independent patent claim 3 by virtue of the fact that the control device is embodied in terms of circuit technology in such a way that, in the forward D position of the selector lever, all the position sensors can be checked and the failure of a position sensor and/or of a control line can be determined and/or the control device is embodied in terms of circuit technology in such a way that, in the parking P position, a short circuit to ground of the control lines assigned to the position sensors can be determined.

By means of the control device embodied according to the invention, there are now "statistical diagnostics" and not, as previously in the prior art, "dynamic diagnostics" of the individual position sensors, in particular of the Hall sensors. In the state of rest of the motor vehicle, namely in the parked state, that is to say when the selector lever is in the parking P position, it is possible to check all the position sensors in the tip gate immediately when the driver activates the electrical system of the motor vehicle. The selector lever therefore no longer needs to be moved, as previously in the prior art, along the shift gate from the position P or R as far as the position D for checking of the position sensors to be able to take place in the tip gate. Consequently, a fault of the position sensors or of the control lines assigned to the position sensors is also detected at an early time so that the driver can also be warned early. Overhasty reactions of the driver when faults are diagnosed are avoided by this means. Furthermore, the control device according to the invention is embodied in terms of circuit technology in such a way that in the neutral N or forward D position of the selector lever, that is to say before the position M for manual gearshifts is reached, it is possible to check whether or not there is a short-circuit to ground [lacuna] which are assigned to the position sensors in the tip gate. In this way too, the driver of the motor vehicle can be warned promptly before the position M for manual gearshifts is engaged so that overhasty reactions are avoided. Finally, in a further embodiment, the control device is also embodied in terms of circuit technology in such a way that, in the forward D position of the selector lever, all the position sensors can be checked and the failure of a position sensor and/or of a control line can be determined, and, as a further alternative, the control device is embodied in terms of circuit technology in such a way that, in the parking P position of the selector lever, a short-circuit in the control lines assigned to the position sensors can be determined. As a result, the disadvantages described at the beginning are avoided by the control device according to the invention.

There are then a multiplicity of possible ways of advantageously configuring and developing the control device according to the invention. In this respect, firstly the patent claims which are dependent on patent claims 1, 2 and 3 can be referred to. In particular, a plurality of preferred embodiments of the invention will now be explained in more detail in the following description and the associated drawing.

DESCRIPTION OF THE PREFERRED EMBODIMENTS

FIGS. 1 to 7 are simplified schematic views—at least partial views—of the control device 1 according to the invention for a transmission (not illustrated here in more detail) which can be shifted automatically and manually, in a motor vehicle (not illustrated either).

The control device 1 which is illustrated here is implemented on an electrical/electronic basis, which will become clearer below. The control device 1 has, as is apparent from FIGS. 2, 4 and 6, a selector lever 2 for setting different positions. The selector lever 2 can assume the forward D, neutral N, reverse R and parking P positions here, and is correspondingly guided into these positions here in the shift gate (not designated in more detail). Furthermore, the selector lever 2 can assume the position M for manual gearshifts, which becomes clear in particular from FIGS. 2e to 2g, FIGS. 4e to 4g and FIGS. 6c to 6d. Here, the selector lever 2 can be moved in the tip gate (not designated in more detail either), it being possible for the selector lever 2 to assume the central position M for manual gearshifts in this tip gate and then for a first and second tip switch 3a and 3b to be activated within this tip gate. The first tip switch 3a is the "tip +" switch here and the second tip switch 3b is the "tip −" switch here, the position M, or the switch 4, lying between the first tip switch 3a and the second tip switch 3b. In order to control the transmission, corresponding position sensors 5 and control lines 6, which output corresponding signals for manually shifting the transmission ratios up or down to a control unit 7, are then provided. It is possible to determine a failure of the position sensors 5 and/or of the control lines 6 assigned to the position sensors 5.

It is significant here that the control unit 7 is implemented on an electrical/electronic basis, as is basically also the case currently in the prior art, so that further statements are not necessary here. A first position sensor 5a is assigned to the first tip switch 3a, a second position sensor 5b to the second tip switch 3b, and a third position sensor 5c to the position M for manual gearshifts, that is to say for the switch 4. In other words, the position sensors 5a to 5c form at least partially the switches 3*a*, 3*b* and 4 which are closed by a permanent magnet.

The disadvantages described at the beginning are avoided by virtue of the fact that the control device 1 is embodied in terms of circuit technology in such a way that at least in the parking P position or the reverse R position of the selector lever 2 all the position sensors 5 which are arranged within the tip gate can be checked and the failure of even just one position sensor 5*a*, 5*b* or 5*c* can be determined. Furthermore, the control device 1 is embodied in terms of circuit technology in such a way that in the neutral N position or the forward D position of the selector lever 2 it is possible to determine a short-circuit to ground at least between some of the corresponding control lines 6*a*, 6*b* and 6*c* which are assigned to the position sensors 5*a*, 5*b*, 5*c*. The embodiment in terms of circuit technology described here is illustrated, at least partially, in FIGS. 2 and 4. Finally, a further embodiment of the invention is described, illustrated in FIG. 6, which also avoids the disadvantages described here by virtue of the fact that the control device 1 is embodied in terms of circuit technology in such a way that in the forward D position of the selector lever 2 all the position sensors 5 can be checked and the failure of a position sensor 5, a short-circuit to "+" and/or a break in a control line 6 can be determined and/or the control device 1 is embodied in terms of circuit technology in such a way that in the parking P position of the selector lever 2 a short-circuit to ground at least between some of the control lines 6 assigned to the position sensors 5 can be determined. By this means, an audible and/or visual warning signal for the driver of the motor vehicle can be avoided already a long time before the engagement of the selector lever 2 into the position M, that is to say before the introduction of the selector lever 2 into the tip gate, if the driver starts the motor vehicle, namely switches on the electrical system, when, for example, the selector lever 2 is still in the parking P position or in the forward D position. Short-circuits between some of the control lines 6*a*, 6*b* or 6*c* assigned to the position sensors 5*a*, 5*b* or 5*c* can be determined if the selector lever 2 is in the neutral N position or the forward D position (first embodiment) or else in the parking P position (third embodiment), that is to say can be determined a long time before the selector lever 2 is moved into the position M for manual gearshifts. This is dependent on the respective embodiment of the control device 1 according to the invention.

When a fault occurs at a position sensor 5*a*, 5*b*, 5*c* or at a control line, a fault message is triggered. The fault message triggers an audible and/or visual warning signal here.

The position sensors 5*a*, 5*b* and 5*c* for the positions "tip +", the position M or the position "tip –", that is to say the position sensors 5*a* and 5*b* for the tip switches 3*a* and 3*b*, are then formed by Hall sensors, as is already known in the prior art. FIGS. 2 and 4 illustrate a first and second embodiment of the control device 1. They show that the selector lever 2 is assigned a first permanent magnet 8, which can be moved together with the selector lever 2, as a first trigger for the position sensors 5*a*, 5*b* and 5*c*. Furthermore, a second permanent magnet 9 is provided as second trigger for the position sensors 5*a*, 5*b* and 5*c*, it being possible to arrange the second permanent magnet 9 on a shutter which covers the selector lever pivoting region and which is not illustrated here in more detail. However, it is also possible, as illustrated here, to connect the second permanent magnet 9 to the first permanent magnet 8 via a connecting web. The second permanent magnet 9 is embodied or arranged here in such a way that, in the parking P position of the selector lever 2, all the position sensors 5*a*, 5*b* and 5*c* are triggered. This is clearly apparent in FIG. 2*a* as the second permanent magnet 9 is correspondingly long here so that it overlaps all three position sensors 5*a*, 5*b* and 5*c*. Consequently, all the position sensors 5 are triggered in this position of the selector lever 2 (see FIG. 2*a*).

Figure 2A:
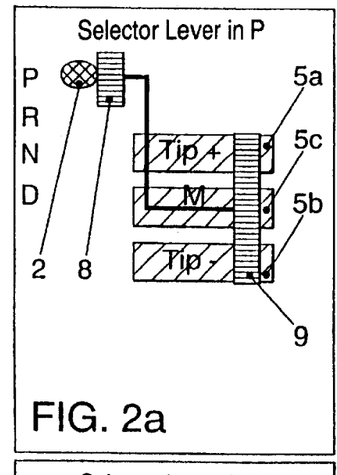
FIGS. 2a–g show a simplified schematic view of the different settings of the selector lever and the switch settings or activation of the position sensors which are associated therewith in accordance with a first embodiment of the control device according to the invention.
Figure 2B:
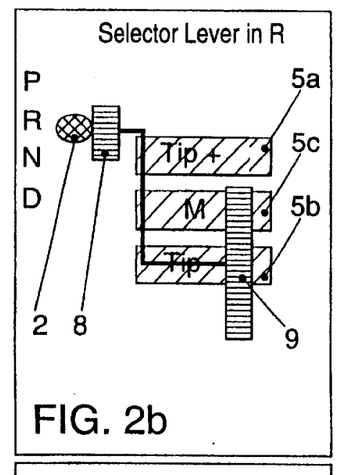
Figure 2C:
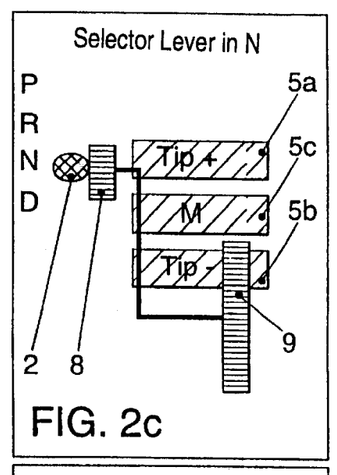
Figure 2D:
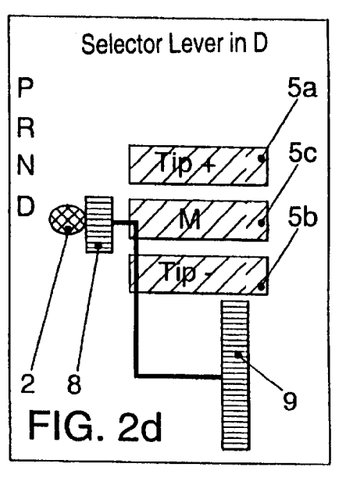

In comparison to FIG. 2*b*, where the selector lever 2 is in the reverse R position, in this position R of the selector lever 2 only the position sensor 5*c* is triggered for the position M, and the position sensor 5*b* for the second tip switch 3*b*. FIG. 2*c* shows that the second permanent magnet 9 is embodied or arranged in such a way that, in the neutral N position of the selector lever 2, only the position sensor 5*b* for the second tip switch 3*b* is triggered, no position sensor 5 being triggered in the forward D position of the selector lever 2 (cf. FIG. 2*d*)

Figure 2E:
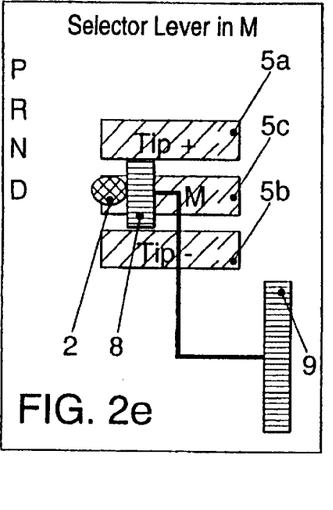
Figure 2F:
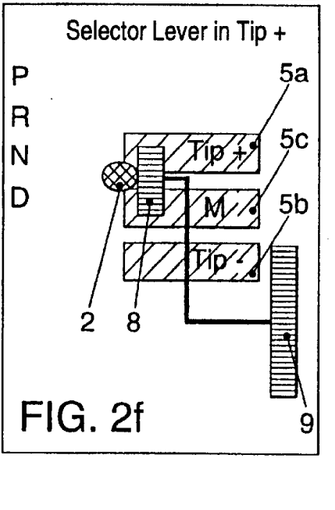
Figure 2G:
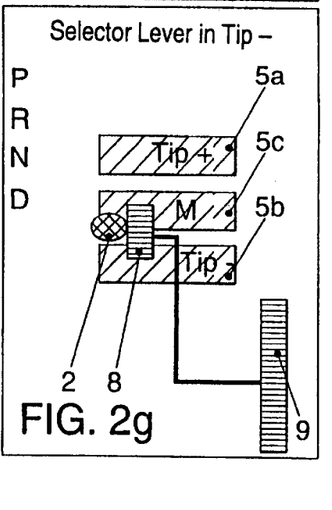

FIGS. 2*e* to 2*g* show the triggering of the position sensors 5 in the various settings of the selector lever 2 by the first permanent magnet 8, that is to say when the selector lever 2 is in any case moved in the tip gate and no diagnostics are necessary here during the movement of the selector lever 2 within the tip gate. The diagnostics of the position sensors 5 are carried out in the settings of the selector lever 2 if the latter is in the parking P, reverse R or neutral N position, that is to say in the shift gate.

Figure 1:
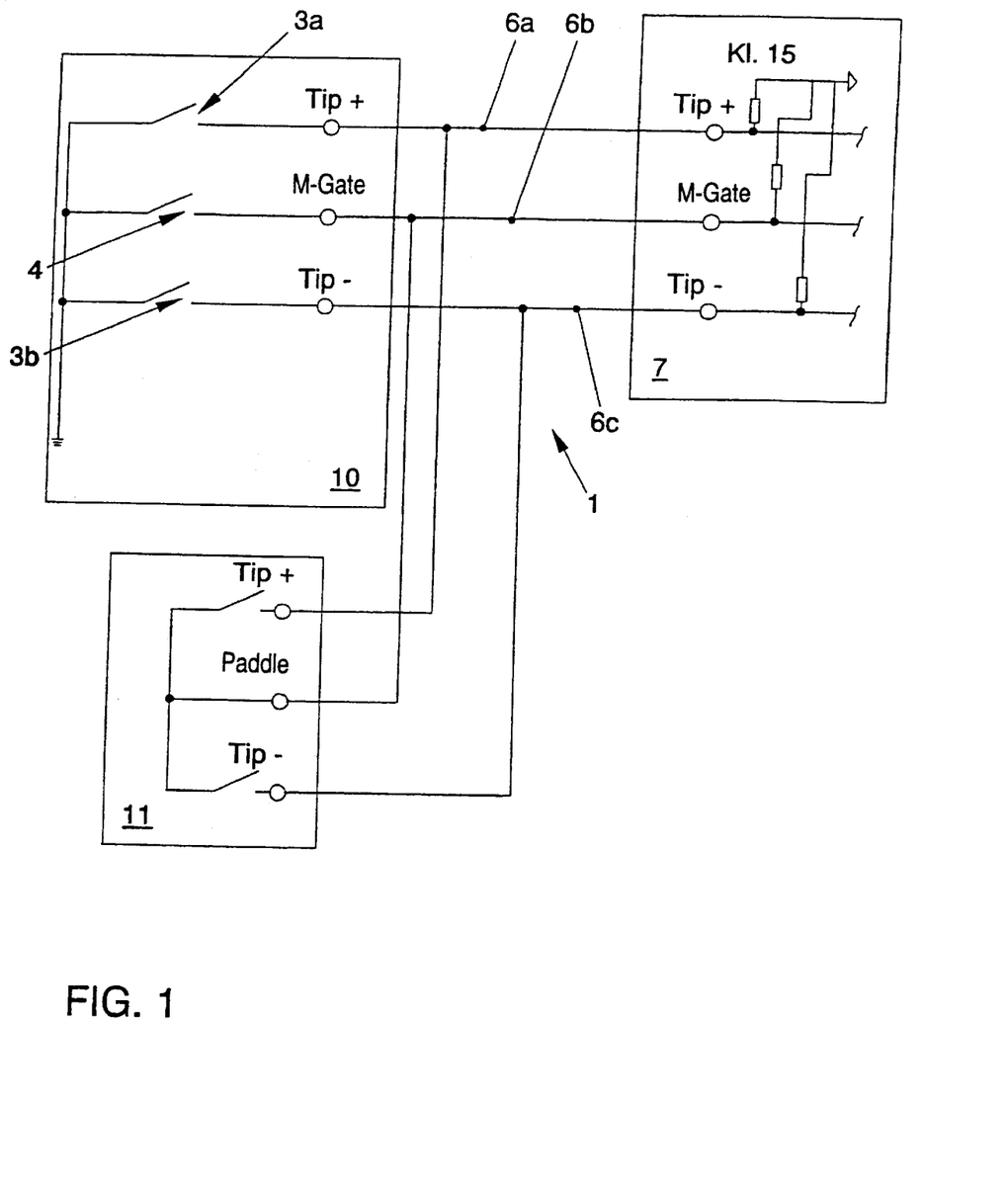
FIG. 1 shows a simplified schematic view of a basic circuit diagram of the embodiments which are explained here for the control device according to the invention on which diagnostics can be performed.

FIG. 1 shows a simplified schematic view of the basic circuit diagram for the embodiments shown here for the control device 1 on which diagnostics can be performed. The schematic representation shows the gearshift cover 10, the control unit 7 which is electronic or functions on an electrical basis and a paddle 11, provided in addition on the steering wheel, and the corresponding control lines 6. The control device 1 is then embodied in terms of circuit technology in such a way that when a tip switch 3 is activated a ground potential is connected to the input of the control unit 7. Consequently, the control unit 7 can detect if the corresponding switches, that is to say the first tip switch 3*a*, the second tip switch 3*b* or the switch 4, are correspondingly activated for the precise position M, in particular by virtue of the fact that specifically one of the two permanent magnets 8 or 9 triggers the corresponding position sensors 5 here. If the selector lever 2 is then not in the tip gate and if the control unit 7 is informed of this on the basis of the position sensors (not illustrated in detail here) which are in the normal shift gate, the triggering of the switch positions in the tip gate is carried out by means of the second permanent magnet 9 and the corresponding checking of the position sensors 5 and control lines 6 using the control unit 7. FIG. 1 additionally shows—which is a secondary remark here—a paddle 11 which is arranged on the steering wheel of the motor vehicle, merely intended to represent the fact that the manual shift positions "tip +" and "tip –" which are possible by means of the shift lever 2 can also be carried out by means of the corresponding paddle 11 on the steering wheel and the activation keys provided here.

Figure 5:
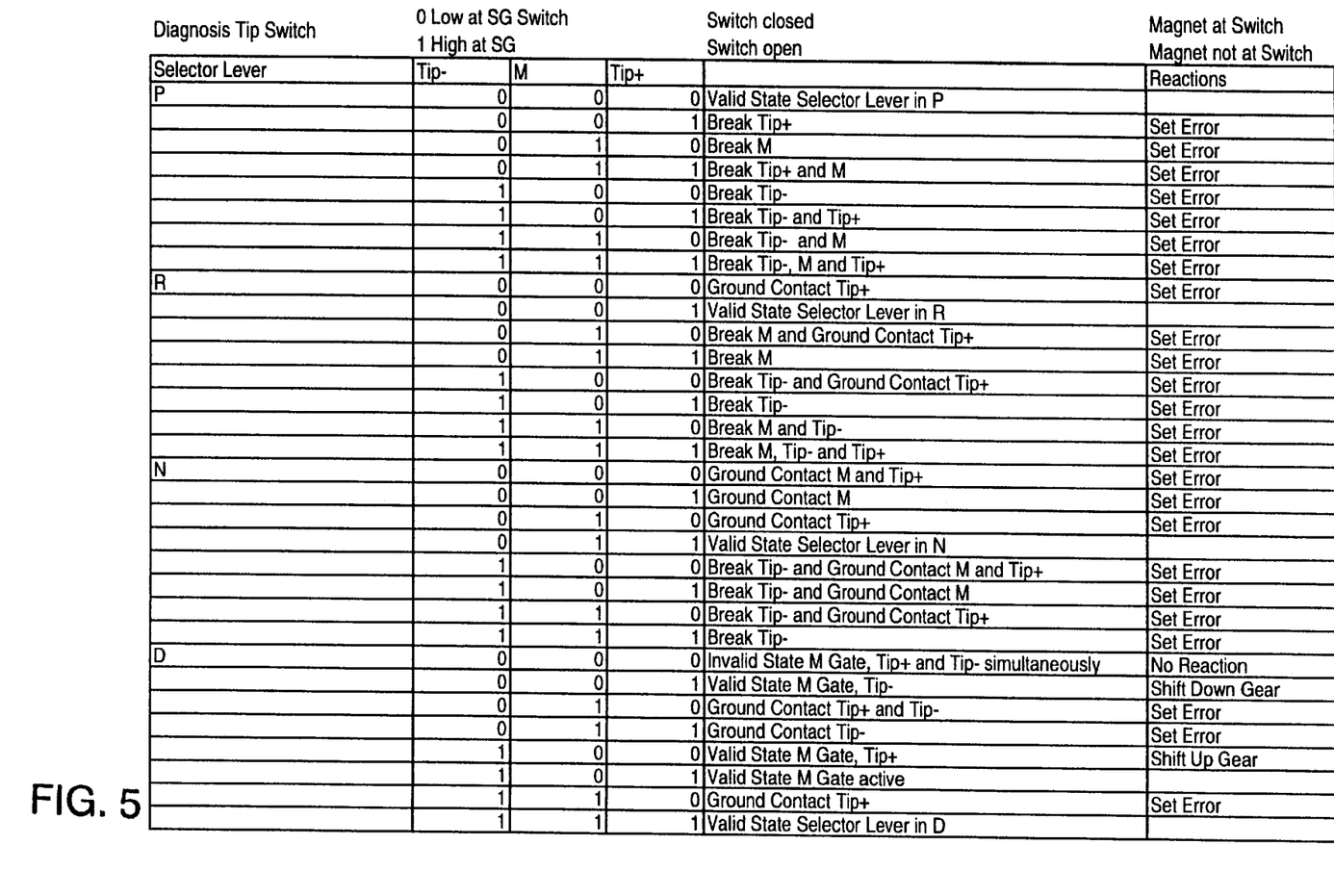
FIG. 5 shows a table with the valid or invalid shift positions.

The table illustrated in FIG. 5 then provides information on the corresponding possibilities of the different settings of the selector lever 2. Here, a closed switch is designated by the numeral "0", and an open switch is designated by the numeral "1". The corresponding "states" during the setting of the selector lever 2 in the parking P, reverse R, neutral N and forward D positions, that is to say in particular the positions shown in FIGS. 2*a* to 2*d* and 4*a* to 4*d*, are illustrated. According to the "matrix" in FIG. 5, a "fault is set" by the control unit 7 if no valid state is determined. For each setting of the selector lever 2 in the different positions P, R, N or D shown here, specifically only a single diagnosis is possible, said diagnosis describing the valid state, that is to say the state in which it is determined that the corresponding position sensors 5 or control lines 6 are operationally capable. If specifically, for example, it is the case that not all the position sensors 5a, 5b and 5c, that is to say the correspondingly arranged Hall sensors here, are triggered in the parking P position for the selector lever 2 by the second permanent magnet 9, not all the signals with the numeral "0" are present and a "fault" is set. Thus, in the reverse R position of the selector lever 2, the first tip switch 3a must be opened as the latter is not triggered by the second permanent magnet 9, i.e. the position sensor 5a is not triggered as a Hall sensor here via the second permanent magnet 9. The valid state for the selector lever 2 in the reverse R position therefore has the signal sequence "0", "0" and "1" for the second tip switch 3b, the switch 4 and the second tip switch 3a, and for the position sensors 5 and control lines 6 provided here. For all the other combinations, the control unit 7 sets corresponding faults, and the audible and/or visual warning device is triggered. The other valid states of the selector lever 2 in the neutral N and forward D positions can be found in the table from FIG. 5.

Figure 3:
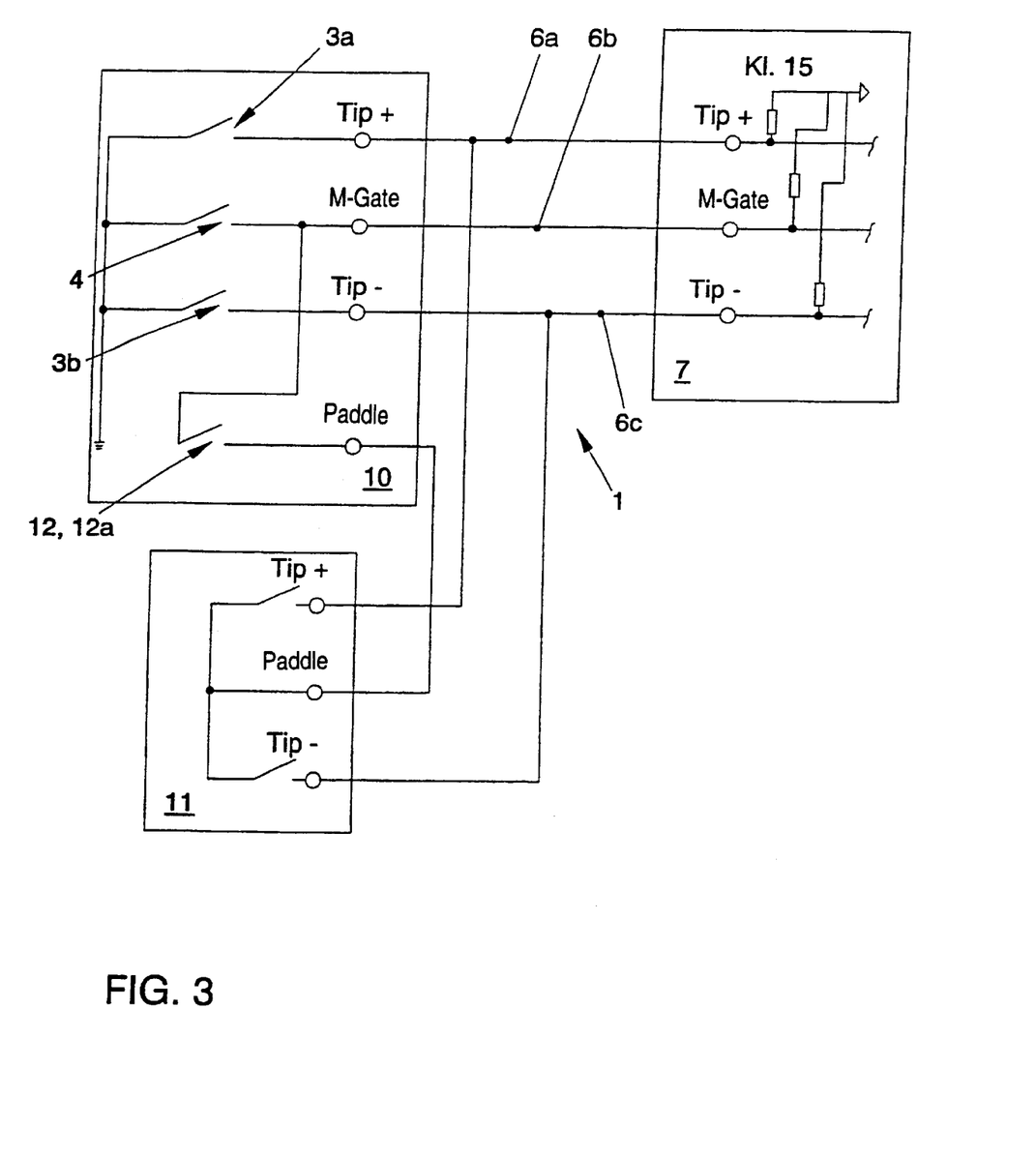
FIG. 3 shows a simplified schematic view of an extended circuit diagram for a second embodiment of the control device according to the invention on which diagnostics can be performed, specifically with an additional paddle circuit.
Figure 4A:
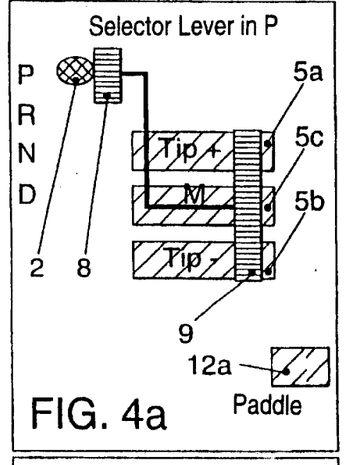
FIGS. 4a–g show the different switch positions or activation of the position sensors in a simplified schematic view for this second embodiment.
Figure 4B:
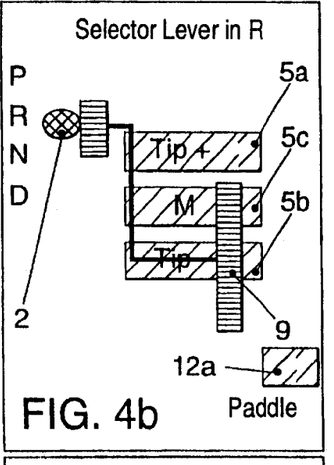
Figure 4C:
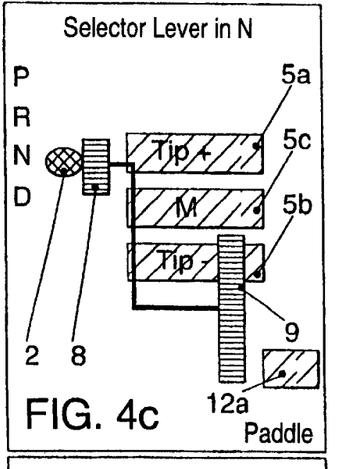
Figure 4D:
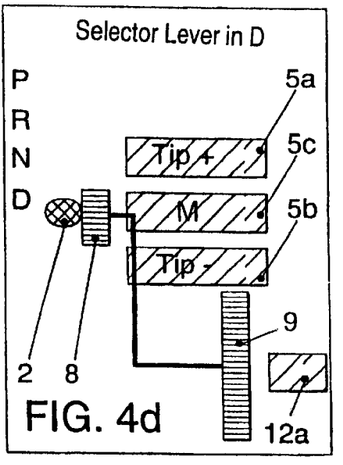
Figure 4E:
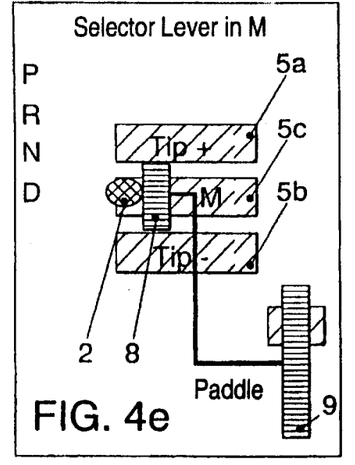
Figure 4F:
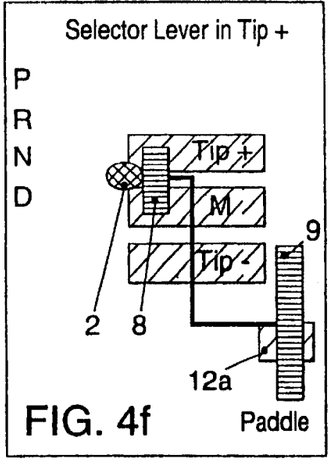
Figure 4G:
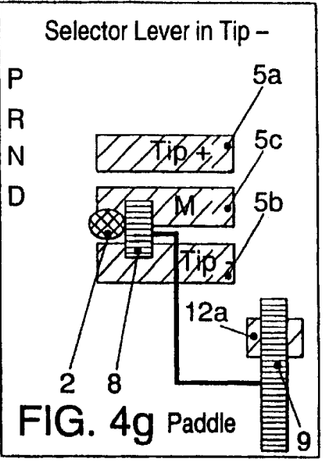

The diagnostics are then carried out using the control unit 7 which partially functions on an electronic/electrical basis, or has a microprocessor with corresponding software, and via the existing control lines 6 for the position sensors 5, specifically the "three-conductor wiring" which can be seen in FIGS. 1 and 3. Evaluation can then be carried out (cf. FIG. 5) by means of the incoming signals at the inputs of the electronic control unit 7 from the different switch positions or "position sensor" triggering operations in combination with the current position of the selector lever 2. The current position of the selector lever 2 in the shift gate is determined by means of additionally provided sensors. If the selector lever 2 is therefore not in the tip gate but rather in the normal shift gate, the control unit 7 determines the operational capability or operational incapability of the individual position sensors 5 or control lines 6 by reference to the signals coming in at that time, without a dynamic movement of the selector lever 2 being required. Therefore, "statistical" determination of the operational capability or incapability takes place here.

FIGS. 3 and 4 show here, in comparison to FIGS. 1 and 2, a second further embodiment of the control device 1 as a paddle circuit 12, which is connected in parallel with the switches arranged on the gearshift cover 10, is provided here, and an additional Hall switch 12a also being integrated within the gearshift cover 10. The circuit shown here has the advantage that the paddle circuit 12 is activated only if the selector lever 2 is also in the position M, i.e. is in the tip gate and thus enables this paddle circuit 12 as, for example, a fault diagnosis could occur in the circuit in FIG. 1 if the selector lever 2 is located in the reverse R position and the "tip +" switch is pressed at the paddle 11. Here, according to FIG. 3, the second permanent magnet 9 is then arranged in such a way that the paddle circuit 12 is not activated until the selector lever 2 is in the tip gate. Fault diagnostics are thus avoided.

Short-circuits and breaks in the circuit can also be diagnosed, and in fact even double faults (for example break "tip +" and "tip −") can even be detected so that warning messages can be made in good time. As a result, with an automatic transmission, it is possible to dispense with the additional selector lever settings "3" to "1" described at the beginning. The diagnostics are preferably carried out here by means of the existing three-conductor wiring so that no additional diagnostic line is necessary. No additional electronics are required in the gearshift cover 10 either.

A simple and cost-effective type of solution is provided here by means of the second permanent magnet 9 which is mechanically coupled to the actual shift magnet 9 in the gearshift cover 10 so that all three switches 3a, 3b and 4 are activated in the parking P selector lever setting. Both permanent magnets 8 and 9 are connected to one another in such a way that they do not drop off individually. The arrangement of the first and second permanent magnets 8 and 9 illustrated in FIGS. 2 and 4 is essentially Z-shaped.

Whereas FIGS. 1 to 5 show first and second embodiments of the control device 1 according to the invention, namely a Z-shaped arrangement of the first and second permanent magnets 8 and 9, FIG. 6 shows a third embodiment of the control device 1 according to the invention.

By means of this third embodiment of the control device 1, the control device 1 is now embodied in terms of circuit technology in such a way that, in the forward D position of the selector lever 2, all the position sensors 5 can be checked and the failure of a position sensor 5 and/or of a control line 6 can be determined, or, as a further additional alternative, that, in the parking P position of the selector lever 2, a short-circuit to ground in some of the assigned control lines 6 can be determined.

Basically, the circuit diagram illustrated in FIGS. 1 and 3 is also based on the third embodiment of the control device 1 according to the invention. The essential difference for the first and second embodiments is that the first and second permanent magnets 8 and 9 are not arranged in a type of Z shape with respect to one another here, but rather are arranged in a type of T shape with respect to one another. In the preferred embodiment illustrated here, the first and second permanent magnets 8 and 9 are, as it were, combined to form a single physical unit 13 so that the physical unit 13 has a test magnet part 13a and a switching magnet part 13b. Here, the test magnet part 13a and the switching magnet part 13b are arranged in a T shape with respect to one another. The physical unit 13 illustrated here can be arranged directly on the selector lever 2 or on the gearshift cover 10 in a specific position. This is dependent on the respective specific embodiment.

In this embodiment, it is of particular advantage that the T-shaped arrangement of the magnets does not require any large installation space so that a very space-saving design is possible. The T-shaped arrangement therefore leads to fewer installation space problems. The magnets move together and can therefore be combined to form one component, namely to form one physical unit 13, so that the mechanical connecting web (illustrated in FIGS. 2 and 4 but not designated here in more detail) between the permanent magnets 8 and 9 can be dispensed with.

The essential difference in comparison with the third embodiment is, however, that the "test logic" is now inverted in comparison with the "test logic" for the first two embodiments, i.e. in the parking P position for the selector lever 2, all the position sensors 5 are now not activated or triggered but rather these position sensors 5 are activated or triggered only in the forward D position of the selector lever 2 (switch closed). In the third embodiment, the tests or diagnostics in the reverse R and neutral N positions of the selector lever 2 are therefore preferably dispensed with.

Figure 6A:
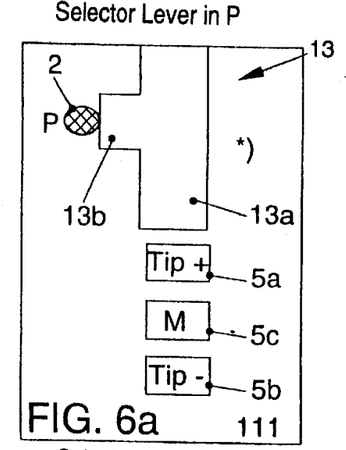
FIGS. 6a–f show a simplified schematic view of a plurality of different settings of the selector lever and the switch settings or activation of the position sensors associated therewith in accordance with a third embodiment of the control device according to the invention.

As is shown by FIGS. 6a to 6f, in particular FIG. 5a, the selector lever 2 is located here in the parking P position, the test magnet part 13a being located outside the tip sensors, namely the position sensors 5, so that the position sensors 5a, 5b and 5c are not activated here. As the sensors are switched by the principle "switch to ground", in this open state a "high" signal, that is to say the "1" signal, is present at the control unit 7. Ground connections are detected if a "low" signal is present at the input of the control unit 7 (signal "0"). FIG. 6a therefore shows a signal sequence for the switch or the position sensors 5 of "1/1/1" for all three position sensors 5a, 5b and 5c illustrated here. In this positioning of the selector lever 2 illustrated here, that is to say for FIG. 6a, short-circuits to ground at the control lines 6 assigned to the position sensors 5 can therefore be determined.

Figure 6B:
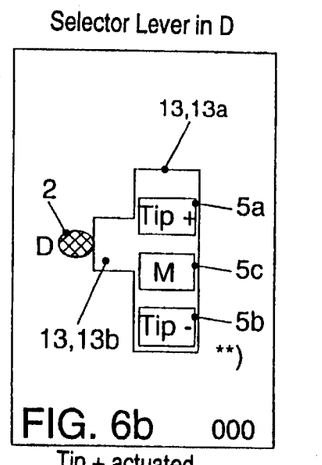
Figure 6C:
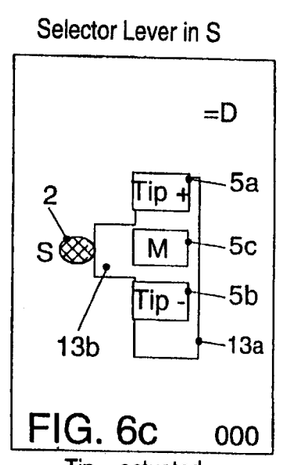

In FIG. 6b, the selector lever 2 is in the forward D position so that the test magnet part 13a overlaps all the position sensors 5a, 5b and 5c here. Consequently, in this case, the signal sequence "0/0/0" is present at the input of the control unit 7 as a corresponding "low" signal is respectively present at the control unit 7. In this case, line breaks or a short-circuit to "+" of the control lines 6 or even a failure of the position sensors 5a, 5b and 5c or after a "dropping off" of the position sensors 5 can be detected. The same applies to the position of the selector lever 2 in FIG. 6c, specifically here in the position of the sporty stage "S". FIG. 6c is illustrated here only additionally and shows another alternative for forward "D", similar to FIG. 6b.

Figure 6D:
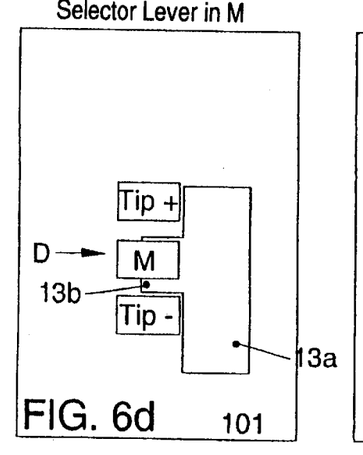
Figure 6E:
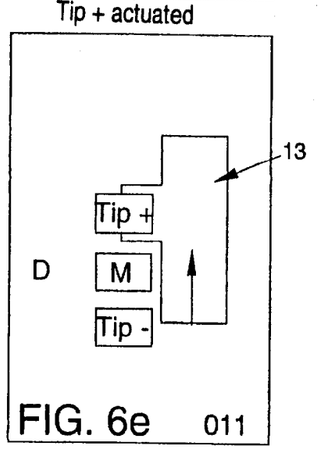
Figure 6F:
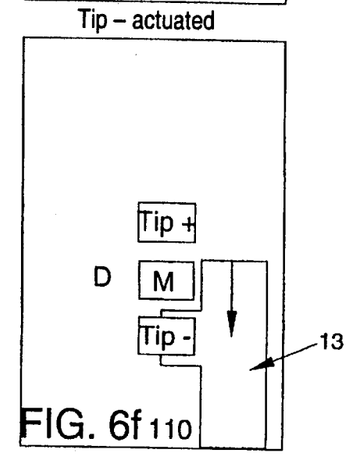

If, as illustrated in FIG. 6d, the selector lever 2 is then moved out of the shift gate into the tip gate, specifically into the setting for the position M for manual gearshifts, only the central sensor, specifically the position sensor 5c, is then activated or triggered by the physical unit 13 embodied here in a T shape. The signals of the sensors for "tip +" and "tip −" change their state from "low" to "high". During the corresponding movement of the selector lever 2 to "tip +", the corresponding position sensor 5a is then activated so that the signal then changes from "1" to "0". The same applies to the movement of the selector lever 2 to "tip −".

For the changing of the selector lever 2 into the tip gate starting from the shift gate, the same applies as for the first two embodiments as, in the third embodiment, the steering wheel paddle switches "tip +" and "tip −" which are also arranged can be correspondingly switched. Only if the corresponding sensor or the switch 4 is activated here are the steering wheel paddle switches therefore also enabled. Otherwise, the steering wheel paddle switches on the steering wheel are disabled. The switching operation is carried out here in such a way that, given a correspondingly activated tip gate and sequential activation of the paddle circuit, the system is held in the state first detected. If both paddle switches are activated absolutely synchronously, the system detects the same state as in the forward D driving position and switches back into the safe automatic mode, preferably forward D.

Figure 7:
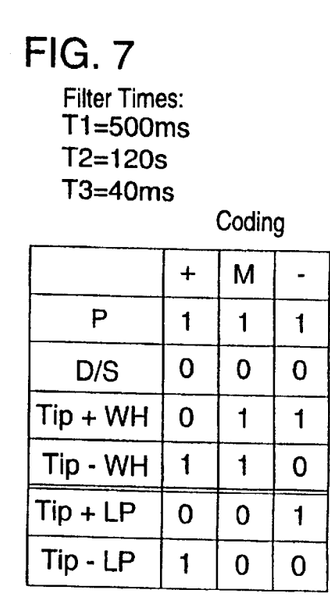
FIG. 7 shows a table with exemplary valid shift positions for the third embodiment of the control device according to the invention illustrated in FIG. 6.

The respective logic table for the third embodiment illustrated in FIGS. 6a to 6f is illustrated in FIG. 7. Here, in each case the valid states are given. The first four lines show the valid shift states for the selector lever 2 and the last two lines show the valid switch states when the steering wheel paddle switches are activated. If a different coding is determined at the input of the control unit 7 from that illustrated for the individual switch states, in each case a "fault" is set by the control unit 7. As a result, in each case a matrix (cf. FIG. 7) is produced so that the valid and the invalid switch combinations can be detected. Information about failures of position sensors 5, breaks in control lines 6 and corresponding connections to ground can be obtained from invalid switch combinations.

We claim:

1. A control device for a transmission which can be shifted automatically and manually in a motor vehicle, having a selector lever for setting at least the forward, neutral, reverse, parking positions and a position for manual gearshifts, it being possible to activate a tip circuit in the position for manual gearshifts, corresponding signals for manually shifting the transmission ratios up or down being output to a control unit in order to control the transmission via position sensors and control lines, and it being possible to determine a failure of the position sensors and/or of the control lines assigned to the position sensors, characterized in that the control device is embodied in terms of circuit technology in such a way that, at least in the parking or reverse position of the selector lever, by triggering at least one of the position sensors at least one of the triggered position sensors can be checked and the failure of a position sensor and/or of a control line can be determined, and in that a fault message is triggered when the failure of a position sensor and/or of a control line is determined.

2. The control device according to claim 1, characterized in that all the position sensors can be checked by triggering the position sensors.

3. The control device according to claim 1, characterized in that the tip circuit has two tip switches.

4. A control device for a transmission which can be shifted automatically and manually in a motor vehicle, having a selector lever for setting at least the forward, neutral, reverse, parking positions and a position for manual gearshifts, it being possible to activate a tip circuit in the position for manual gearshifts, corresponding signals for manually shifting the transmission ratios up or down being output to a control unit in order to control the transmission via position sensors and control lines, and it being possible to determine a failure of the position sensors and/or of the control lines assigned to the position sensors, characterized in that the control device is embodied in terms of circuit technology in such a way that, in the forward position of the selector lever, by triggering at least one of the position sensors at least one of the triggered position sensors can be checked and the failure of a position sensor and/or of a control line can be determined, and in that a fault message is triggered when the failure of a position sensor and/or of a control line is determined.

5. The control device according to claim 4, characterized in that all the position sensors can be checked by triggering the position sensors.

6. The control device according to claim 4, characterized in that the tip circuit has two tip switches.

* * * * *